US012215274B1

(12) United States Patent
Bai et al.

(10) Patent No.: US 12,215,274 B1
(45) Date of Patent: Feb. 4, 2025

(54) RESIN SLURRY PLUGGING SYSTEM SUITABLE FOR FRACTURED-VUGGY FORMATION AND PREPARATION AND USE THEREOF

(71) Applicants: CHINA UNIVESITY OF PETROLEUM (EAST CHINA), Qingdao (CN); SOUTHWEST PETROLEUM UNIVESITY, Chengdu (CN)

(72) Inventors: Yingrui Bai, Qingdao (CN); Jingbin Yang, Qingdao (CN); Jinsheng Sun, Qingdao (CN); Yang Bai, Chengdu (CN); Ren Wang, Beijing (CN); Kaihe Lv, Qingdao (CN); Guancheng Jiang, Beijing (CN); Fan Liu, Beijing (CN); Chengyuan Xu, Chengdu (CN)

(73) Assignees: CHINA UNIVESITY OF PETROLEUM (EAST CHINA), Qingdao (CN); SOUTHWEST PETROLEUM UNIVESITY, Chengdu (CN)

( * ) Notice: Subject to any disclaimer, the term of this patent is extended or adjusted under 35 U.S.C. 154(b) by 0 days.

(21) Appl. No.: 18/780,564

(22) Filed: Jul. 23, 2024

(30) Foreign Application Priority Data

Apr. 2, 2024 (CN) .......................... 202410390561.0

(51) Int. Cl.
*C09K 8/42* (2006.01)
*C09K 8/44* (2006.01)
(Continued)

(52) U.S. Cl.
CPC ............... *C09K 8/426* (2013.01); *C09K 8/44* (2013.01); *C09K 8/56* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 3,597,196 A | 8/1971 | Jones et al. | |
| 3,929,191 A * | 12/1975 | Graham | E21B 43/267 166/308.2 |
| 5,921,317 A * | 7/1999 | Dewprashad | E21B 43/267 166/308.5 |

FOREIGN PATENT DOCUMENTS

| CN | 115850629 A | 3/2023 |
|---|---|---|
| GB | 1173154 A | 12/1969 |

* cited by examiner

*Primary Examiner* — Anuradha Ahuja
(74) *Attorney, Agent, or Firm* — CBM PATENT CONSULTING, LLC

(57) ABSTRACT

A resin slurry for a fractured-vuggy formation and the preparation and use thereof, which belong to the field of drilling fluid lost circulation control. The resin slurry plugging system is composed of the following raw materials in mass percentage: 20%-40% of composite resin plugging agent, 0.5%-5.0% of consolidating agent, 0.5%-5.0% of flow pattern regulator, 0.3%-1.2% of cross-linking agent, 0.3%-1.2% of retarder, 3%-12% of filling agent, and the balance of water. The plugging system has a certain fluidity under low-temperature conditions, is easy to be injected into the formation, and can fill a lose channel of a fractured-vuggy reservoir. The consolidating time of the plugging system is controllable, and the construction conditions are safe. The plugging system forms a three-dimensional cross-linked network structure consolidation after cross-linking and consolidating under high-temperature conditions of the formation.

5 Claims, 8 Drawing Sheets

(51) Int. Cl.
*C09K 8/56* (2006.01)
*E21B 21/00* (2006.01)
*E21B 33/138* (2006.01)

RESIN SLURRY PLUGGING SYSTEM SUITABLE FOR FRACTURED-VUGGY FORMATION AND PREPARATION AND USE THEREOF

CROSS-REFERENCE TO RELATED APPLICATIONS

This application claims priority to Chinese Patent Application Ser. No. CN202410390561.0 filed on 2 Apr. 2024.

FIELD OF THE INVENTION

The present disclosure belongs to the field of drilling fluid lost circulation control, specifically relates to a resin slurry plugging system suitable for a fractured-vuggy formation and the preparation and use thereof, and more specifically relates to an ultra-high temperature resistant resin slurry plugging system suitable for a fractured-vuggy formation and a preparation method and use thereof.

BACKGROUND OF THE INVENTION

Lost circulation is a phenomenon that drilling and completion fluids leak into the formation under the action of pressure difference in drilling, cementing, testing, and other borehole operations. The main reservoir space of fractured-vuggy reservoirs is dissolution vugs and large-scale holes, the main lose channel is micro-fractures and vugs, and more than half of wells are prone to serious lost circulation. Many domestic and foreign experts and scholars have studied the lost circulation of porous and fractured reservoirs, but no systematic study has been conducted on the lost circulation of fractured-vuggy reservoirs.

For the ultra-high temperature reservoirs with fractured-vuggy development, the key is that a plugging agent can be retained in fractures and vugs to play the function of accumulation, and at the same time, has a certain bearing strength to avoid leak into the formation and lose the role of plugging. Thermosetting resin materials, which have three-dimensional cross-linked network structure and are insoluble and infusible, have good pressure resistance, heat resistance and excellent mechanical properties, are widely used in various fields as high-strength composite matrix, coatings, adhesives, and the like, and are also one of the common and efficient plugging agents. These materials are unconsolidated at low temperature, are easy to pump and reach the target lost circulation layer, may be cross-linked at a certain temperature to form a bulk consolidation, and easily reside in the fractures of connected vugs, so as to plug the lose channel, which may play a good effect for the lost circulation control in fractured-vuggy reservoirs. With the deep development of oil and gas exploration and development, ultra-high temperature resistance, high strength and long-term stability put forward higher requirements for plugging materials suitable for fractured-vuggy reservoirs. It is difficult for a single consolidated resin such as epoxy resin to have high strength and ultra-high temperature resistance at the same time. A series of composite resin plugging systems with high bearing strength and good temperature resistance have emerged to meet the needs of plugging in ultra-deep fractured-vuggy reservoirs. At the same time, in order to ensure the construction safety of a plugging site, a consolidated resin plugging material must also have a controllable consolidating time.

Chinese patent document CN114517080A discloses a method for preparing a liquid drilling plugging material. Thermosetting resin such as unsaturated polyester resin and phenolic resin is selected, which is low-viscous liquid at normal temperature and is consolidated at high temperature for plugging, and has the characteristic of controllable consolidating time under temperature-sensitive conditions, and the consolidated material has the characteristics of high temperature and high pressure resistance, high mechanical strength and universality for various formations, and can achieve efficient plugging. However, the consolidating time under high temperature and ultra-high temperature conditions is too short, which still does not meet the safe construction conditions, and the material is only suitable for porous and fractured reservoirs due to the weak pressure-bearing capacity for plugging large fractures. Chinese patent document CN116284607A discloses a method for preparing a water-soluble controllable consolidating resin plugging agent. A combination of a plurality of consolidated resins, such as water-soluble epoxy resin and water-soluble urea-formaldehyde resin, is used, which has the properties of easy injection allocation, strong filling, strong residence, high temperature resistance, and high strength, and is an underground consolidating or cross-linking continuous phase plugging material. Before consolidating, the material is not restricted by a lose channel of fractures and vugs, and can meet the basic requirements for plugging in different fracture and vug combinations of a fractured-vuggy carbonate rock. However, the temperature resistance of the plugging agent is not strong, the bearing strength under high-temperature conditions is insufficient, and it is difficult to meet the requirements of plugging in ultra-high temperature (more than 200° C.) fractured-vuggy reservoirs.

In view of the above problems, it is necessary to develop an ultra-high temperature resistant resin slurry plugging system suitable for fractured-vuggy reservoirs. Composite resin is selected, which has the advantages of good temperature resistance and high strength. By adding other materials and controlling the consolidating time, an ultra-high temperature resistant, high pressure-bearing and consolidating-controllable composite resin plugging system for fractured-vuggy reservoirs may be finally formed.

SUMMARY OF THE INVENTION

In view of the deficiencies of the prior art, the present disclosure provides a resin slurry plugging system suitable for a fractured-vuggy formation and the preparation and use thereof. The resin slurry plugging system has a certain fluidity under low-temperature conditions, is easy to be injected into the formation, and can fill a lose channel of a fractured-vuggy reservoir. The consolidating time of the plugging system is controllable, and the construction conditions are safe. The plugging system forms a three-dimensional cross-linked network structure consolidation after cross-linking and consolidating under high-temperature conditions of the formation, has a strong retention capacity, and can effectively reside in fractures and vugs, thereby plugging the lose channel, and achieving strong temperature resistance and plugging pressure-bearing capacity.

The technical solution of the present disclosure is as follows:

An ultra-high temperature resistant resin slurry plugging system suitable for a fractured-vuggy formation is composed of the following raw materials in mass percentage: 20%-40% of composite resin plugging agent, 0.5%-5.0% of consolidating agent, 0.5%-5.0% of flow pattern regulator, 0.3%-1.2% of cross-linking agent, 0.3%-1.2% of retarder, 3%-12% of filling agent, and the balance of water.

According to the present disclosure, the ultra-high temperature resistant resin slurry plugging system suitable for a fractured-vuggy formation is preferably composed of the following raw materials in mass percentage: 20%-35% of composite resin plugging agent, 1.0%-3.0% of consolidating agent, 1%-3% of flow pattern regulator, 0.4%-0.9% of cross-linking agent, 0.5%-1.0% of retarder, 5%-10% of filling agent, and the balance of water.

According to the present disclosure, the composite resin plugging agent is preferably prepared from the following raw materials in parts by mass: 20-30 parts of phenolic resin, 0.3-0.8 parts of modifier, 5-15 parts of epoxy resin, 5-15 parts of unsaturated polyester resin, 0.5-1.5 parts of cross-linking agent, and 0.2-0.6 parts of tackifying polymer.

Preferably, the composite resin plugging agent is prepared from the following raw materials in parts by mass: 25 parts of phenolic resin, 0.5 parts of modifier, 10 parts of epoxy resin, 10 parts of unsaturated polyester resin, 0.9 parts of cross-linking agent, and 0.4 parts of tackifying polymer.

Preferably, the modifier is an isocyanate-terminated polyurethane prepolymer.

Preferably, the phenolic resin is a water-soluble phenolic resin. The epoxy resin is a water soluble epoxy resin. The unsaturated polyester resin is a 3198-type unsaturated polyester resin.

Preferably, the cross-linking agent is a combination of styrene and trimethylolpropane. Further preferably, the mass ratio of the styrene to the trimethylolpropane is 1-3:1, preferably 2:1.

Preferably, the tackifying polymer is a copolymer of 2-acrylamide-2-methylpropane sulfonic acid and acrylic acid.

Preferably, a method for preparing the composite resin plugging agent includes the following steps:
(1) heating the phenolic resin to 90-110° C., vacuumizing and cooling the phenolic resin, adding the modifier, and obtaining a modified resin through a reaction;
(2) uniformly mixing the modified resin, the epoxy resin and the unsaturated polyester resin to obtain a mixture, adding the mixture into water, then successively adding the cross-linking agent and the tackifying polymer, performing full mixing and uniform dispersing, and then performing drying and crushing to obtain the composite resin plugging agent.

Further preferably, in step (1), the vacuumizing time is 0.1-1 h, the temperature drops to 40-60° C., and the reaction is carried out for 1-3 h at the reaction temperature of 80-120° C. under vacuum conditions. The main purpose of step (1) of vacuumizing and reacting under vacuum is to remove bubbles and volatile substances in the resin, thereby avoiding the formation of defects in a final product. In addition, the viscosity of the resin can also be reduced, thereby further improving its fluidity and processability. By heating and reacting at higher temperature, the phenolic resin can be softened, and the fluidity can be increased, which contributes to acceleration of chemical reactions in the resin, thereby increasing the degree of consolidating and final properties of the resin.

Further preferably, in step (2), the mass ratio of the epoxy resin to water is 1:2-5. The drying temperature is 50-70° C., and the drying time is 20-30 h. The particle size of the composite resin plugging agent is 1.0-2.5 mm.

According to the present disclosure, the consolidating agent is preferably one or a combination of two or more of methyl tetrahydrophthalic anhydride, ammonia, triethanolamine, a bio-based latent consolidating agent or hexamethylene tetramine. Preferably, the consolidating agent is a bio-based latent consolidating agent capable of delaying the time for consolidating the resin. The bio-based latent consolidating agent is an imidazole-oxazine consolidating agent (IMBA).

Preferably, the imidazole-oxazine consolidating agent (IMBA) is prepared from the following raw materials in parts by mass: 10-30 parts of imidazole (IM), 10-20 parts of phytic acid (PA), and 10-30 parts of bisphenol A-benzoxazine (BA-a).

Further preferably, the imidazole-oxazine consolidating agent (IMBA) is prepared from the following raw materials in parts by mass: 20 parts of imidazole (IM), 16.5 parts of phytic acid (PA), and 20 parts of bisphenol A-benzoxazine (BA-a).

Further preferably, a method for preparing the imidazole-oxazine consolidating agent (IMBA) includes the following steps:

adding a methanol solution of the phytic acid (PA) dropwise to a methanol solution of the imidazole (IM); adding the bisphenol A-benzoxazine (BA-a), performing full and uniform mixing, standing for layering, and extracting supernatant liquid; and washing the supernatant liquid to obtain the imidazole-oxazine consolidating agent (IMBA).

Further preferably, the mass concentration of the methanol solution of the phytic acid (PA) is 0.1-0.5 g/mL, and the mass concentration of the methanol solution of the imidazole (IM) is 0.2-0.6 g/mL.

Further preferably, the washing method includes the following steps: adding a washing agent to the supernatant liquid, stirring at room temperature for 0.5-2 h, standing for layering, and extracting the supernatant liquid; repeating the above-mentioned steps 2 to 3 times on the obtained supernatant liquid; and rotatably evaporating the supernatant liquid to obtain the imidazole-oxazine consolidating agent (IMBA). Further preferably, the washing agent is absolute ethanol.

According to the present disclosure, the flow pattern regulator is preferably one or a combination of two or more of hydroxypropyl guar gum, xanthan gum, modified cellulose or composite polymer high temperature resistant flow pattern regulator. Preferably, the modified cellulose is hydroxypropyl methylcellulose.

Preferably, the composite polymer high temperature resistant flow pattern regulator is prepared from the following raw materials in parts by mass: 10-20 parts of 2-acrylamide-2-methylpropane sulfonic acid (AMPS), 4-10 parts of N,N-methylene bisacrylamide (MBA), 20-25 parts of acrylic acid (AA), 10-20 parts of N-vinyl pyrrolidone (NVP), 5-10 parts of divinylbenzene (DVB), 2-3 parts of sodium dodecyl sulfate, 5-10 parts of modified hydrophilic inorganic nano-material, and 1-1.5 parts of initiator.

Further preferably, the composite polymer high temperature resistant flow pattern regulator is prepared from the following raw materials in parts by mass: 15 parts of 2-acrylamide-2-methylpropane sulfonic acid (AMPS), 7.5 parts of N,N-methylene bisacrylamide (MBA), 22.5 parts of acrylic acid (AA), 15 parts of N-vinyl pyrrolidone (NVP), 7.5 parts of divinylbenzene (DVB), 2.5 parts of sodium dodecyl sulfate, 6.25 parts of modified hydrophilic inorganic nano-material, and 1.375 parts of initiator.

Further preferably, the modified hydrophilic inorganic nano-material is hydrophilic nano-silica with a particle size of 20-100 nm.

Further preferably, the initiator is a combination of azobis (isobutyronitrile), sodium bisulfite and ammonium persulfate. Further preferably, the mass ratio of the azobis(isobutyronitrile), the sodium bisulfite to the ammonium persulfate is 1-3:1-4:2-8. Preferably, the mass ratio is 1:1.5:3.

Further preferably, a method for preparing the composite polymer high temperature resistant flow pattern regulator includes the following steps:

adding the 2-acrylamide-2-methylpropane sulfonic acid (AMPS), the N,N-methylene bisacrylamide (MBA), the acrylic acid (AA), the N-vinyl pyrrolidone (NVP), the divinyl benzene (DVB), and the sodium lauryl sulfate into deionized water, adjusting the pH to neutral, and performing full dispersing and uniform mixing; and adding the modified hydrophilic inorganic nanomaterial and the initiator, performing a stirring reaction, then performing precipitation, washing, drying, and grinding to obtain the composite polymer high temperature resistant flow pattern regulator.

Further preferably, the mass ratio of the 2-acrylamide-2-methylpropane sulfonic acid (AMPS) to the deionized water is 1:1-10.

Further preferably, sodium hydroxide is used for adjusting the pH to neutral.

Further preferably, the stirring reaction is performed for 3-5 h at the stirring reaction temperature of 65-75° C. under an inert gas atmosphere. Further preferably, the inert gas is nitrogen or argon.

Further preferably, the precipitation is performed by adding anhydrous ethanol or acetone to reaction liquid. The drying conditions are: vacuum drying at 40-60° C. for 10-20 h.

Further preferably, the composite polymer high temperature resistant flow pattern regulator has a particle size of 0.5-1.5 mm.

According to the present disclosure, the cross-linking agent is preferably one or a combination of two or more of hydroxypropyl acrylate, diethylenetriamine, p-toluenesulfonic acid, trimethylolethane or dimethyltriphenylmethane tetraisocyanate. Preferably, the cross-linking agent is a combination of diethylenetriamine and dimethyl triphenyl methane tetraisocyanate. Further preferably, the mass ratio of diethylenetriamine to dimethyl triphenylmethane tetraisocyanate is (1-2): 1.

According to the present disclosure, the retarder is preferably one of or a combination of two or more of sodium lignosulfonate, sodium gluconate, calcium saccharate, phosphogypsum or sodium fatty alcohol polyoxyethylene ether sulfate. Preferably, the retarder is a combination of sodium lignosulfonate and calcium saccharate. Further preferably, the mass ratio of the sodium lignosulfonate to the calcium saccharate is 1:1.

According to the present disclosure, the filling agent is preferably one of or a combination of two or more of ultra-fine calcium carbonate, quartz sand, walnut shell, fiber, or mica flake. Preferably, the filling agent is a combination of ultra-fine calcium carbonate and quartz sand. Further preferably, the mass ratio of the ultra-fine calcium carbonate to the quartz sand is (1-2):(3-5).

The method for preparing the ultra-high temperature resistant resin slurry plugging system suitable for a fractured-vuggy formation includes the following steps:

adding the composite resin plugging agent into water, and stirring until fully dispersed; adding the retarder, and stirring until fully dispersed; then successively adding the cross-linking agent, the consolidating agent and the flow pattern regulator, and stirring until fully dispersed; and adding the filling agent, and stirring until fully dispersed, so as to obtain the ultra-high temperature resistant resin slurry plugging system suitable for a fractured-vuggy formation.

According to the present disclosure, the stirring rate after adding the composite resin plugging agent is preferably 400-600 rpm, preferably 500 rpm.

According to the present disclosure, the stirring rate after adding the retarder is preferably 400-600 rpm, preferably 500 rpm.

According to the present disclosure, the stirring rate after adding the cross-linking agent, the consolidating agent, and the flow pattern regulator is preferably 300-500 rpm, preferably 400 rpm.

According to the present disclosure, the stirring rate after adding the filling agent is preferably 500-700 rpm, preferably 600 rpm.

Use of the ultra-high temperature resistant resin slurry plugging system suitable for a fractured-vuggy formation in drilling fluid plugging in fractured-vuggy reservoirs is provided.

According to the present disclosure, the ultra-high temperature resistant resin slurry plugging system may be preferably directly prepared at a drilling site, then injected into a target lost circulation layer, and consolidated at a formation temperature so as to play a plugging function. Preferably, the formation temperature is 180-280° C.

The technical features and advantageous effects of the present disclosure are as follows:

1. A consolidated composite resin plugging agent is added into the ultra-high temperature resistant resin slurry plugging system suitable for a fractured-vuggy formation provided by the present disclosure. Compared with a single thermosetting resin, the composite resin plugging agent compounded with various thermosetting resins such as phenolic resin, epoxy resin and unsaturated polyester resin has both the temperature resistance of the phenolic resin and the high strength of the epoxy resin and the unsaturated polyester resin. The overall temperature resistance, strength and comprehensive performance of the cross-linked plugging agent have been further improved, and the plugging agent may be applied to lost circulation control in fractured-vuggy reservoirs. The addition of a tackifying polymer can effectively improve the adhesion and cohesion of the resin slurry system, so that the filling agent can be uniformly dispersed in the system.

2. A consolidating agent is added into the ultra-high temperature resistant resin slurry plugging system suitable for a fractured-vuggy formation provided by the present disclosure. Preferably, the consolidating agent is an imidazole-oxazine consolidating agent, which has the characteristics of low-temperature stability and high-temperature consolidating reactivity, and can delay the consolidating of the resin. The imidazole molecule has both a pyrrole nitrogen atom at position 1 and a pyridine nitrogen atom at position 3, thereby initiating a chain polymerization reaction in the consolidating system. Benzoxazine undergoes a ring-opening polymerization reaction at a certain temperature to form a cross-linked network structure containing a phenolic hydroxyl group. The phenolic hydroxyl group undergoes a polymerization reaction with an epoxy group in the composite resin plugging agent to achieve latent consolidating of the resin while improving the temperature resistance of the resin. The introduction of phytic acid molecules with twelve active protons increases the density of the epoxy cross-linked network and increases the rigidity of the polymer network. In addition, a retarder is also introduced into the ultra-high temperature resistant resin slurry plugging system suitable for a fractured-vuggy formation provided by the present disclosure, so as to further prolong the consolidating time of the resin and ensure the safe construction conditions at the plugging site. In the present disclosure, the consolidating time of the plugging system can be controlled by formulating the types and amounts of additives such as the consolidating agent and the retarder.

3. A filling agent such as ultra-fine calcium carbonate and quartz sand is added the ultra-high temperature resistant resin slurry plugging system suitable for a fractured-vuggy formation provided by the present disclosure and filled in a consolidated resin plugging slurry. The resin has a strong deformation capacity before consolidating, so as to fill large-scale lose channels such as fractures and vugs in fractured-vuggy reservoirs, and filling materials such as ultra-fine calcium carbonate and quartz sand are bridged and accumulated therein, which is beneficial to forming a dense plugging layer and improving the bearing strength of the plugging system.

4. A flow pattern regulator added into the ultra-high temperature resistant resin slurry plugging system suitable for a fractured-vuggy formation provided by the present disclosure is preferably a composite polymer high temperature resistant flow pattern regulator, which can maintain the viscosity and shear force of the plugging system within a suitable range, improve the suspension capacity of the system, make the filling materials such as ultra-fine calcium carbonate and quartz sand uniformly dispersed in the system, and avoid the problem of low strength caused by non-uniform distribution of the filling agent and low strength in some areas.

5. The method for preparing the ultra-high temperature resistant resin slurry plugging system suitable for a fractured-vuggy formation provided by the present disclosure is simple and easy to operate, has a low cost, and is suitable for well site allocation and injection.

6. The resin slurry plugging system has a certain fluidity under low-temperature conditions, is easy to be injected into the formation, and can fill a lose channel of a fractured-vuggy reservoir. The consolidating time of the plugging system is controllable, and the construction conditions are safe. The plugging system forms a three-dimensional cross-linked network structure consolidation after cross-linking and consolidating under high-temperature conditions of the formation, has a strong retention capacity, and can effectively reside in fractures and vugs, thereby plugging the lose channel, and achieving strong temperature resistance and plugging pressure-bearing capacity. According to the present disclosure, the raw material compositions are integrated to work together to achieve the excellent effects of the present disclosure. The absence or substitution of any raw materials, as well as the unfavorable proportioning, will reduce the performance of the plugging system obtained.

DETAILED DESCRIPTION OF THE EMBODIMENTS

Figure 1A:
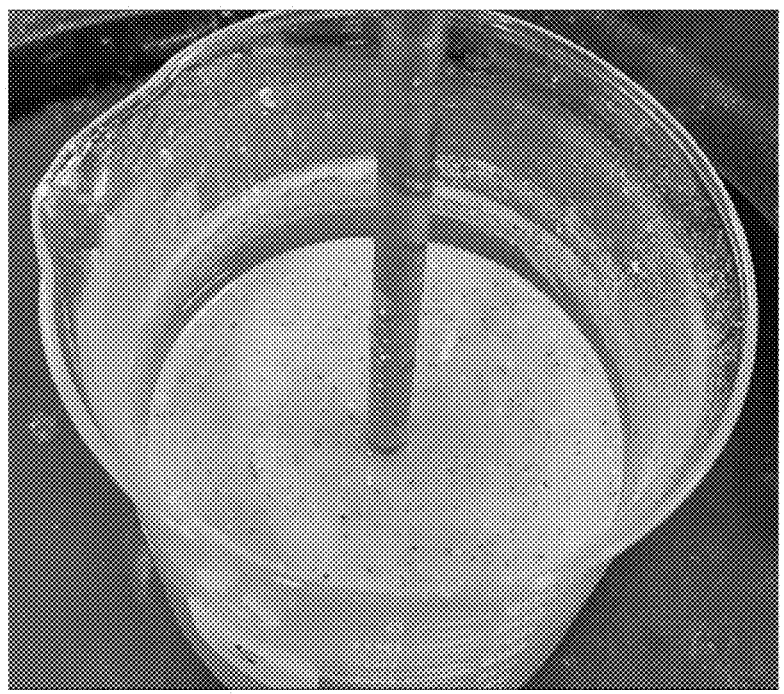
FIG. 1 is a photograph showing an appearance of a resin slurry plugging system prepared in Examples 1-2 and Comparative Example 1.

The present disclosure will now be further described with reference to specific embodiments, without being limited thereto. The raw materials used in the embodiments are all conventional raw materials, and may be obtained commercially or prepared according to existing methods. The methods are existing technologies unless otherwise specified.

In the examples, phenolic resin is a water-soluble phenolic resin, commercially available from Jining Huakai Resin Co., Ltd.

Epoxy resin is a water-soluble epoxy resin, commercially available from Guangdong Zhongke Zhiyuan New Material Technology Co., Ltd.

An isocyanate-terminated polyurethane prepolymer is an MDI-terminated polyurethane prepolymer, commercially available from Jining Liduo Chemical Co., Ltd.

A tackifying polymer is a copolymer of 2-acrylamide-2-methylpropane sulfonic acid and acrylic acid, commercially available from Shanghai Macklin Biochemical Co., Ltd.

Bisphenol A-benzoxazine is commercially available from Jinan Shengquan Group Share-Holding Co., Ltd.

Preparative Example 1

A method for preparing the composite resin plugging agent includes the following steps:
(1) 25 g of phenolic resin was added into a three-necked flask equipped with a stirrer and a thermometer, and the three-necked flask was heated to 100° C., vacuumized for 0.5 h and then cooled to 50° C., followed by pumping 0.5 g of isocyanate-terminated polyurethane prepolymer, warming to 100° C. and then reacting at a constant temperature under vacuum for 2 h to prepare a modified phenolic resin.
(2) The obtained modified phenolic resin, 10 g of epoxy resin and 10 g of unsaturated polyester resin (3198-type) were uniformly mixed and added into 30 g of water, followed by sequentially adding 0.6 g of styrene, 0.3 g of trimethylolpropane and 0.4 g of tackifying polymer and stirring at a speed of 250 rpm until fully mixed and uniformly dispersed to obtain a mixed solution.
(3) The mixed solution was put into a vacuum drying oven and dried at 60° C. for 24 h, and the dried solid was crushed to form a granular powder to obtain a composite resin plugging agent with a particle size of 1.0-2.5 mm.

Preparative Example 2

A method for preparing a bio-based latent consolidating agent (imidazole-oxazine consolidating agent (IMBA)) includes the following steps:

(1) 20 g of imidazole (IM) and 16.5 g of phytic acid (PA) were dissolved in 50 mL of methanol to obtain solution A and solution B, respectively.
(2) Solution B obtained was added dropwise to solution A to obtain solution C, and 20 g of bisphenol A-benzoxazine (BA-a) was added to solution C to obtain a mixed solution, which was stirred at 30° C. for 0.5 h and allowed to stand for layering.
(3) Supernatant liquid of the mixed solution was poured out, and anhydrous ethanol was added to obtain solution D, which was stirred continuously at room temperature for 1 h.
(4) The stirred solution D was allowed to stand at 0° C. for 1 h, step (3) was repeated three times, and the supernatant liquid was extracted each time.
(5) The anhydrous ethanol was removed by using a rotary evaporator to finally obtain an imidazole-oxazine consolidating agent (IMBA).

Preparative Example 3

A method for preparing a flow pattern regulator (composite polymer high temperature resistant flow pattern regulator) includes the following steps:
(1) 15 g of 2-acrylamide-2-methylpropane sulfonic acid (AMPS), 7.5 g of N,N-methylene bisacrylamide (MBA), 22.5 g of acrylic acid (AA) and 22.5 g of deionized water were added into a four-necked flask equipped with a thermometer, a stirring rod and a condenser tube, followed by successively adding 15 g of N-vinylpyrrolidone (NVP) and 7.5 g of divinylbenzene (DVB).
(2) 2.5 g of sodium dodecyl sulfate was continuously added, sodium hydroxide was used for adjusting the pH to neutral, and the temperature was increased to 40° C., followed by full stirring for full dissolution.
(3) 6.25 g of modified hydrophilic inorganic nano-material nano-silica (hydrophilic nano-silica, with a particle size of 20 nm, model PST-H20, available from Nanjing Baokete New Material Co., Ltd.) was added continuously.
(4) Nitrogen was introduced, the temperature was increased to 70° C., 0.25 g of azobis(isobutyronitrile) was added and stirred continuously, followed by adding 0.375 g of sodium bisulfite and 0.75 g of ammonium persulfate, maintaining the temperature, and performing the stirring reaction for 4 h.
(5) After the reaction was completed, the reaction product was naturally cooled to room temperature, precipitated with acetone, repeatedly washed, dried under vacuum at 50° C. for 15 h, and ground to obtain a composite polymer high temperature resistant flow pattern regulator with a particle size of 0.5-1.5 mm.

Preparative Comparative Example 1

A method for preparing a composite resin plugging agent is different from the method described in Preparative Example 1 in that the unsaturated polyester resin was not added. The other steps and conditions were the same as in Preparative Example 1.

Preparative Comparative Example 2

A method for preparing a composite resin plugging agent is different from the method described in Preparative Example 1 in that the modifier was not added. The specific steps are as follows:

(1) 25 g of modified phenolic resin, 10 g of epoxy resin and 10 g of unsaturated polyester resin (3198-type) were uniformly mixed and added into 30 g of water, followed by sequentially adding 0.6 g of styrene, 0.3 g of trimethylolpropane and 0.4 g of tackifying polymer and stirring at a speed of 250 rpm until fully mixed and uniformly dispersed to obtain a mixed solution.
(2) The mixed solution was put into a vacuum drying oven and dried at 60° C. for 24 h, and the dried solid was crushed to form a granular powder to obtain a composite resin plugging agent with a particle size of 1.0-2.5 mm.

Preparative Comparative Example 3

A method for preparing a composite resin plugging agent is different from the method described in Preparative Example 1 in that the tackifying polymer was not added. The other steps and conditions were the same as in Preparative Example 1.

Preparative Comparative Example 4

A method for preparing a composite resin plugging agent is different from the method described in Preparative Example 1 in that the trimethylolpropane was not added and the amount of styrene used was 0.9 g. The other steps and conditions were the same as in Preparative Example 1.

Preparative Comparative Example 5

A method for preparing a bio-based latent consolidating agent is different from the method described in Preparative Example 2 in that the imidazole was not added. The other steps and conditions were the same as in Preparative Example 1.

Preparative Comparative Example 6

A method for preparing a bio-based latent consolidating agent is different from the method described in Preparative Example 2 in that the phytic acid was not added. The other steps and conditions were the same as in Preparative Example 1.

Preparative Comparative Example 7

A method for preparing a flow pattern regulator is different from the method described in Preparative Example 3 in that the modified hydrophilic inorganic nano-material was not added. The other steps and conditions were the same as in Preparative Example 1.

Example 1

An ultra-high temperature resistant resin slurry plugging system suitable for a fractured-vuggy formation is composed of the following raw materials in mass percentage: 35.0% of composite resin plugging agent (prepared by the method in Preparative Example 1), 3.0% of imidazole-oxazine consolidating agent (prepared by the method in Preparative Example 2), 3.0% of composite polymer high temperature resistant flow pattern regulator (prepared by the method in Preparative Example 3), 0.6% of diethylene triamine, 0.3% of dimethyl triphenyl methane tetraisocyanate, 0.5% of sodium lignosulfonate, 0.5% of sugar calcium, 2.0% of ultra-fine calcium carbonate (with a particle size of 20-100 nm), 8.0% of quartz sand (with a particle size of 80-120 m), and the balance of water.

The method for preparing the ultra-high temperature resistant composite resin plugging system suitable for a fractured-vuggy formation includes the following steps:

(a) The composite resin plugging agent was added into water, and stirred at a speed of 500 rpm until fully dispersed to obtain mixed solution E.

(b) The sodium lignosulfonate and the calcium saccharate were added into mixed solution E, and stirred at a speed of 500 rpm until fully dispersed to obtain mixed solution F.

(c) The diethylenetriamine, the dimethyl triphenyl methane tetraisocyanate, the imidazole-oxazine consolidating agent and the composite polymer high temperature resistant flow pattern regulator were added into mixed solution F, and stirred at a speed of 400 rpm until uniformly dispersed to obtain mixed solution G.

(d) The ultra-fine calcium carbonate and the quartz sand were successively added into mixed solution G, and stirred at a speed of 600 rpm until uniformly dispersed, so as to obtain an ultra-high temperature resistant composite resin plugging system suitable for a fractured-vuggy formation, which was denoted as sample $I_1$.

Example 2

An ultra-high temperature resistant resin slurry plugging system suitable for a fractured-vuggy formation is composed of the following raw materials in mass percentage: 20.0% of composite resin plugging agent (prepared by the method in Preparative Example 1), 1.0% of imidazole-oxazine consolidating agent (prepared by the method in Preparative Example 2), 3.0% of composite polymer high temperature resistant flow pattern regulator (prepared by the method in Preparative Example 3), 0.6% of diethylene triamine, 0.3% of dimethyl triphenyl methane tetraisocyanate, 0.5% of sodium lignosulfonate, 0.5% of sugar calcium, 2.0% of ultra-fine calcium carbonate (with a particle size of 20-100 nm), 8.0% of quartz sand (with a particle size of 80-120 m), and the balance of water.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_2$.

Example 3

An ultra-high temperature resistant resin slurry plugging system suitable for a fractured-vuggy formation is composed of the following raw materials in mass percentage: 35.0% of composite resin plugging agent (prepared by the method in Preparative Example 1), 3.0% of imidazole-oxazine consolidating agent (prepared by the method in Preparative Example 2), 1.0% of composite polymer high temperature resistant flow pattern regulator (prepared by the method in Preparative Example 3), 0.6% of diethylene triamine, 0.3% of dimethyl triphenyl methane tetraisocyanate, 0.5% of sodium lignosulfonate, 0.5% of sugar calcium, 2.0% of ultra-fine calcium carbonate (with a particle size of 20-100 nm), 8.0% of quartz sand (with a particle size of 80-120 m), and the balance of water.

With the method for preparing the ultra-high temperature resistant resin slurry plugging system suitable for a fractured-vuggy formation as described in Example 1, an ultra-high temperature resistant resin slurry plugging system suitable for a fractured-vuggy formation is obtained, which was denoted as sample $I_3$.

Example 4

An ultra-high temperature resistant resin slurry plugging system suitable for a fractured-vuggy formation is composed of the following raw materials in mass percentage: 35.0% of composite resin plugging agent (prepared by the method in Preparative Example 1), 3.0% of imidazole-oxazine consolidating agent (prepared by the method in Preparative Example 2), 3.0% of composite polymer anti-high temperature flow pattern regulator (prepared by the method in Preparative Example 3), 0.3% of diethylene triamine, 0.1% of dimethyl triphenyl methane tetraisocyanate, 0.5% of sodium lignosulfonate, 0.5% of sugar calcium, 2.0% of ultra-fine calcium carbonate (with a particle size of 20-100 nm), 8.0% of quartz sand (with a particle size of 80-120 m), and the balance of water.

With the method for preparing the ultra-high temperature resistant resin slurry plugging system suitable for a fractured-vuggy formation as described in Example 1, an ultra-high temperature resistant resin slurry plugging system suitable for a fractured-vuggy formation is obtained, which was denoted as sample $I_4$.

Example 5

An ultra-high temperature resistant resin slurry plugging system suitable for a fractured-vuggy formation is composed of the following raw materials in mass percentage: 35.0% of composite resin plugging agent (prepared by the method in Preparative Example 1), 3.0% of imidazole-oxazine consolidating agent (prepared by the method in Preparative Example 2), 3.0% of composite polymer high temperature resistant flow pattern regulator (prepared by the method in Preparative Example 3), 0.6% of diethylene triamine, 0.3% of dimethyl triphenyl methane tetraisocyanate, 0.25% of sodium lignosulfonate, 0.25% of sugar calcium, 2.0% of ultra-fine calcium carbonate (with a particle size of 20-100 nm), 8.0% of quartz sand (with a particle size of 80-120 m), and the balance of water.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample Is.

Example 6

An ultra-high temperature resistant resin slurry plugging system suitable for a fractured-vuggy formation is composed of the following raw materials in mass percentage: 35.0% of composite resin plugging agent (prepared by the method in Preparative Example 1), 3.0% of imidazole-oxazine consolidating agent (prepared by the method in Preparative Example 2), 3.0% of composite polymer high temperature resistant flow pattern regulator (prepared by the method in Preparative Example 3), 0.6% of diethylene triamine, 0.3% of dimethyl triphenyl methane tetraisocyanate, 0.5% of sodium lignosulfonate, 0.5% of sugar calcium, 1.0% of ultra-fine calcium carbonate (with a particle size of 20-100 nm), 4.0% of quartz sand (with a particle size of 80-120 m), and the balance of water.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_6$.

Example 7

An ultra-high temperature resistant resin slurry plugging system suitable for a fractured-vuggy formation is different from the plugging system described in Example 1 in that the imidazole-oxazine consolidating agent was replaced with hexamethylene tetramine. The other raw material compositions were the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_7$.

Example 8

An ultra-high temperature resistant resin slurry plugging system suitable for a fractured-vuggy formation is different from the plugging system described in Example 1 in that the imidazole-oxazine consolidating agent was replaced with methyl tetrahydrophthalic anhydride. The other raw material compositions were the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample Is.

Example 9

An ultra-high temperature resistant resin slurry plugging system suitable for a fractured-vuggy formation is different from the plugging system described in Example 1 in that the composite polymer high temperature resistant flow pattern regulator was replaced with hydroxypropyl guar gum. The other raw material compositions were the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_9$.

Example 10

An ultra-high temperature resistant resin slurry plugging system suitable for a fractured-vuggy formation is different from the plugging system described in Example 1 in that the diethylene triamine was replaced with hydroxypropyl acrylate. The other raw material compositions are the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_{10}$.

Example 11

An ultra-high temperature resistant resin slurry plugging system suitable for a fractured-vuggy formation is different from the plugging system described in Example 1 in that the dimethyl triphenyl methane tetraisocyanate was replaced with p-toluenesulfonic acid. The other raw material compositions are the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_{11}$.

Example 12

An ultra-high temperature resistant resin slurry plugging system suitable for a fractured-vuggy formation is different from the plugging system described in Example 1 in that the sodium lignosulfonate was replaced with sodium gluconate. The other raw material compositions are the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_{12}$.

Example 13

An ultra-high temperature resistant resin slurry plugging system suitable for a fractured-vuggy formation is different from the plugging system described in Example 1 in that the sugar calcium was replaced with phosphogypsum. The other raw material compositions were the same as in those in Example 1.

With the method for preparing the ultra-high temperature resistant resin slurry plugging system suitable for a fractured-vuggy formation as described in Example 1, an ultra-high temperature resistant resin slurry plugging system suitable for a fractured-vuggy formation was obtained, which was denoted as sample $I_{13}$.

Comparative Example 1

A resin slurry plugging system is different from the plugging system described in Example 1 in that the composite polymer high temperature resistant flow pattern regulator was not added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_1$.

Comparative Example 2

A resin slurry plugging system is different from the plugging system described in Example 1 in that the diethylenetriamine was not added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_2$.

Comparative Example 3

A resin slurry plugging system is different from the plugging system described in Example 1 in that the dimethyl triphenyl methane tetraisocyanate was not added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_3$.

Comparative Example 4

A resin slurry plugging system is different from the plugging system described in Example 1 in that neither diethylenetriamine nor dimethyl triphenyl methane tetraisocyanate was added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_4$.

Comparative Example 5

A resin slurry plugging system is different from the plugging system described in Example 1 in that neither sodium lignosulfonate nor calcium saccharate was added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_5$.

Comparative Example 6

A resin slurry plugging system is different from the plugging system described in Example 1 in that the ultra-fine calcium carbonate was not added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_6$.

Comparative Example 7

A resin slurry plugging system is different from the plugging system described in Example 1 in that the quartz sand was not added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_7$.

Comparative Example 8

A resin slurry plugging system is different from the plugging system described in Example 1 in that neither ultra-fine calcium carbonate nor quartz sand was added. The omitted components were replaced with water in equal amounts. The other raw material compositions were the same as in those in Example 1.

With the method for preparing the resin slurry plugging system as described in Example 1, a resin slurry plugging system was obtained, which was denoted as sample $II_8$.

Comparative Example 9

A resin slurry plugging system is different from the plugging system described in Example 1 in that the composite resin plugging agent prepared by the method in Preparative Example 1 was replaced with the composite resin plugging agent prepared by the method in Preparative Comparative Example 1. The other raw material compositions were the same as in those in Example 1.

With the method for preparing the resin slurry plugging system as described in Example 1, a resin slurry plugging system was obtained, which was denoted as sample $II_9$.

Comparative Example 10

A resin slurry plugging system is different from the plugging system described in Example 1 in that the composite resin plugging agent prepared by the method in Preparative Example 1 was replaced with the composite resin plugging agent prepared by the method in Preparative Comparative Example 2. The other raw material compositions were the same as in those in Example 1.

With the method for preparing the resin slurry plugging system as described in Example 1, a resin slurry plugging system was obtained, which was denoted as sample $II_{10}$.

Comparative Example 11

A resin slurry plugging system is different from the plugging system described in Example 1 in that the composite resin plugging agent prepared by the method in Preparative Example 1 was replaced with the composite resin plugging agent prepared by the method in Preparative Comparative Example 3. The other raw material compositions were the same as in those in Example 1.

With the method for preparing the resin slurry plugging system as described in Example 1, a resin slurry plugging system was obtained, which was denoted as sample liii.

Comparative Example 12

A resin slurry plugging system is different from the plugging system described in Example 1 in that the composite resin plugging agent prepared by the method in Preparative Example 1 was replaced with the composite resin plugging agent prepared by the method in Preparative Comparative Example 4. The other raw material compositions were the same as in those in Example 1.

With the method for preparing the resin slurry plugging system as described in Example 1, a resin slurry plugging system was obtained, which was denoted as sample $II_{12}$.

Comparative Example 13

A resin slurry plugging system is different from the plugging system described in Example 1 in that the imidazole-oxazine consolidating agent prepared by the method in Preparative Example 2 was replaced with the consolidating agent prepared by the method in Preparative Comparative Example 5. The other raw material compositions were the same as in those in Example 1.

With the method for preparing the resin slurry plugging system as described in Example 1, a resin slurry plugging system was obtained, which was denoted as sample $II_{13}$.

Comparative Example 14

A resin slurry plugging system is different from the plugging system described in Example 1 in that the imidazole-oxazine consolidating agent prepared by the method in Preparative Example 2 was replaced with the consolidating agent prepared by the method in Preparative Comparative Example 6. The other raw material compositions were the same as in those in Example 1.

With the method for preparing the resin slurry plugging system as described in Example 1, a resin slurry plugging system was obtained, which was denoted as sample $II_{14}$.

Comparative Example 15

A resin slurry plugging system is different from the plugging system described in Example 1 in that the composite polymer high temperature resistant flow pattern regulator prepared by the method in Preparative Example 3 was replaced with the flow pattern regulator prepared by the method in Preparative Comparative Example 7. The other raw material compositions were the same as in those in Example 1.

With the method for preparing the resin slurry plugging system as described in Example 1, a resin slurry plugging system was obtained, which was denoted as sample $II_{15}$.

Experimental Example

The rheology, temperature resistance, initial consolidating time, compressive strength, and plugging effect of the resin slurry plugging system were tested.

1. Rheology Test: The rheology of the resin slurry plugging system was tested using a six-speed rotary viscometer (model ZNN-D6).
2. Temperature Resistance Test: The resin slurry plugging system was loaded into a temperature-resistant film, placed in a high-temperature aging oven, heated at a temperature of 180° C., 200° C., 220° C., 240° C., 260° C., or 280° C. for 48 h, and taken out for uniaxial compressive strength test to evaluate its temperature resistance.
3. Initial Consolidating Time Test: The resin slurry plugging system was loaded into the temperature-resistant film, placed in the high-temperature aging oven, heated at a temperature of 180° C., 200° C., 220° C., 240° C., 260° C., or 280° C., and taken out at regular intervals to observe the consolidating, and the initial consolidating time of a sample at different temperatures was tested with 30 seconds of mold upside down without fluid outflow as the consolidating standard.
4. Optimal Consolidating Time and Strength Test: The resin slurry plugging system was loaded into the temperature-resistant film, placed in the high-temperature aging oven, heated at a temperature of 260° C., and taken out regularly for uniaxial compression test to find its optimal consolidating time and compressive strength corresponding to the optimal consolidating time. The compressive strength of the consolidated resin slurry plugging system was calculated by formula.
5. Test on Plugging Effect of Resin Slurry Plugging System: The plugging effect of the resin slurry plugging system on fractures was tested by a high-temperature and high-pressure plugging test device. The resin slurry plugging system was loaded into a steel fracture model with a length of 10 cm and a fracture width of 3.0 mm. The model was sealed and placed into the high-temperature aging oven for consolidating. After being consolidated, the resin slurry plugging system in the steel fracture model was taken out from a hot rolling furnace, cooled, and then pressurized by well slurry injected through a large displacement constant-flux pump, the pressure at an inlet end of the fracture model was recorded in real time, and the highest pressure when the well slurry was lost from an outlet end of the fracture model was taken as the pressure-bearing plugging capacity of the resin slurry plugging system on fractures. The test temperature was 180° C., 200° C., 220° C., 240° C., 260° C., or 280° C., and the consolidating time is the optimal consolidating time of the corresponding temperature of the sample.

The performance of the resin slurry plugging system was tested using the above method, and the test results are shown in Tables 1, 2, 3, and 4.

TABLE 1

| | Rheology test data of resin slurry plugging system | | | | | | | | | |
|---|---|---|---|---|---|---|---|---|---|---|
| Sample No. | Absolute viscosity at different revolving speeds (mPa · s) | | | | | | Initial shear/final shear (Pa) | Apparent viscosity (mPa · s) | Plastic viscosity (mPa · s) | Dynamic shear (Pa) |
| | Φ600 | Φ300 | Φ200 | Φ100 | Φ6 | Φ3 | | | | |
| $I_1$ | 185 | 127 | 106 | 87 | 34 | 21 | 9.5/11.5 | 92.5 | 58 | 34.5 |
| $I_2$ | 163 | 112 | 98 | 69 | 25 | 16 | 7/9.5 | 81.5 | 51 | 30.5 |
| $II_1$ | 104 | 71 | 56 | 34 | 13 | 9 | 4/5 | 52 | 33 | 19 |

Figure 1B:
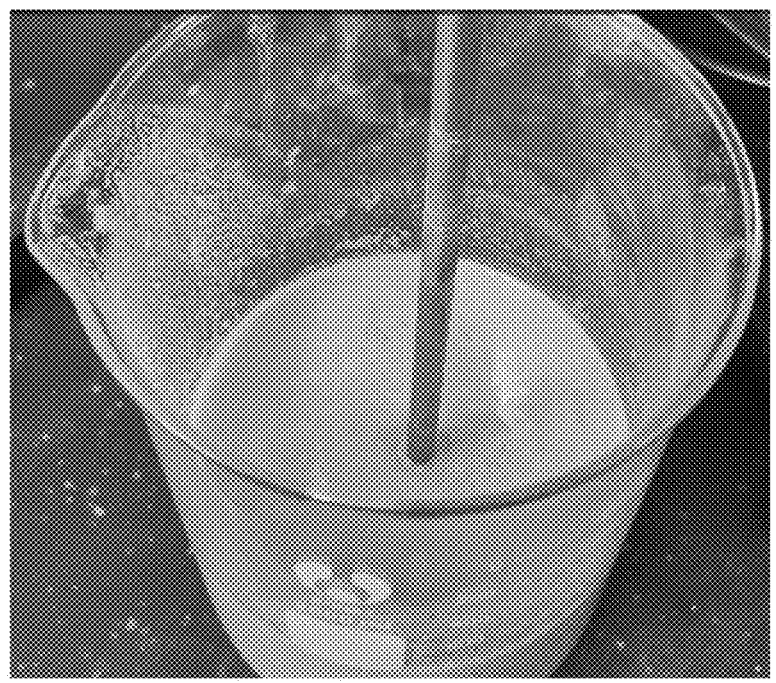
Figure 1C:
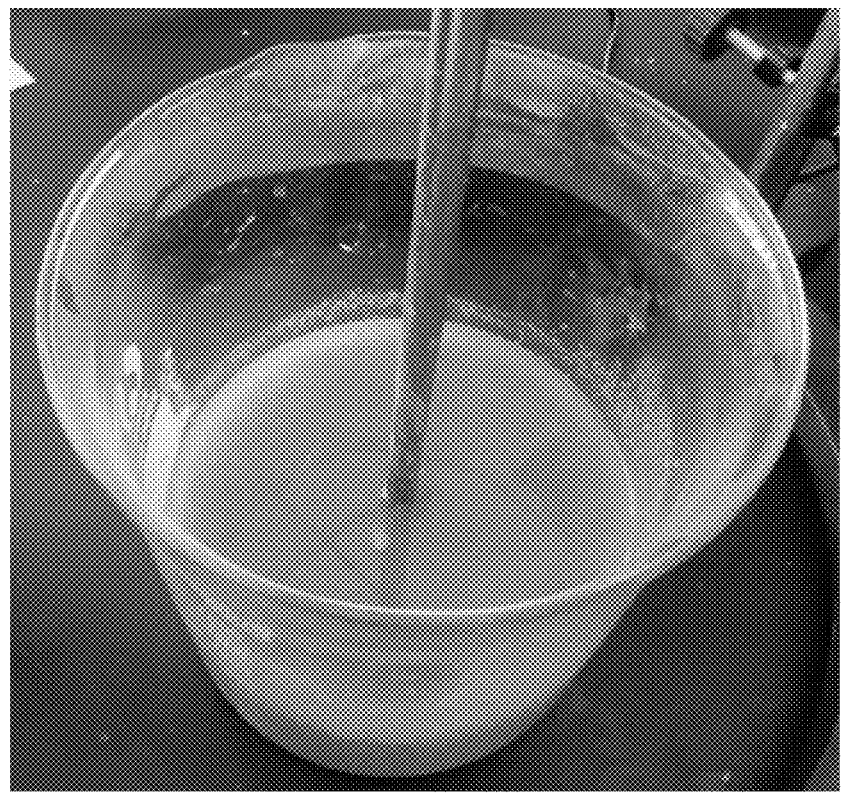
Figure 2A:
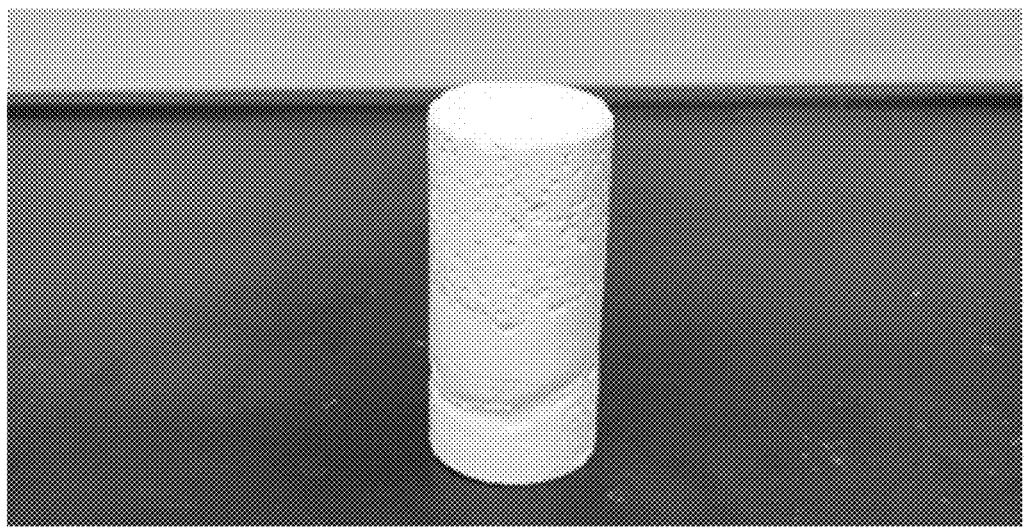
FIG. 2 is a photograph showing an appearance of a resin slurry plugging system prepared in Example 1 after heating at different temperatures for 48 h.
Figure 2B:
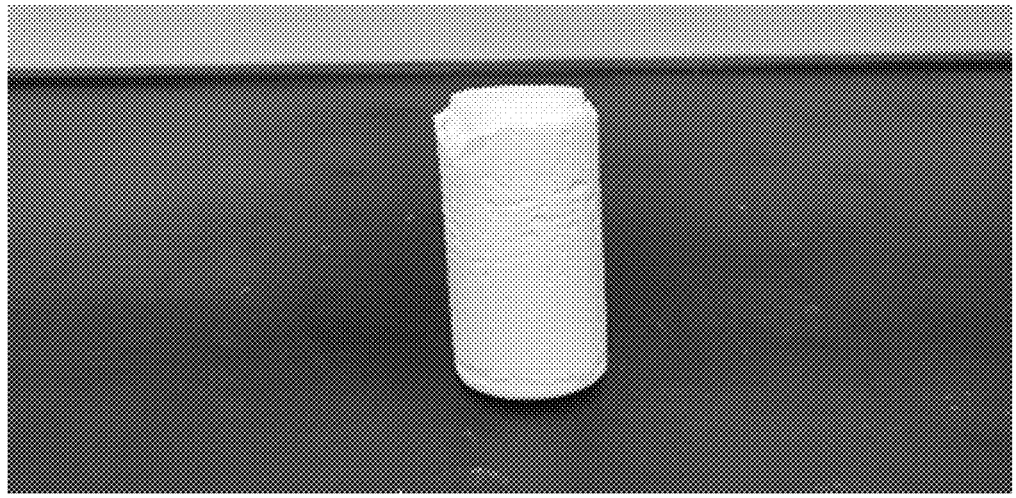
Figure 2C:
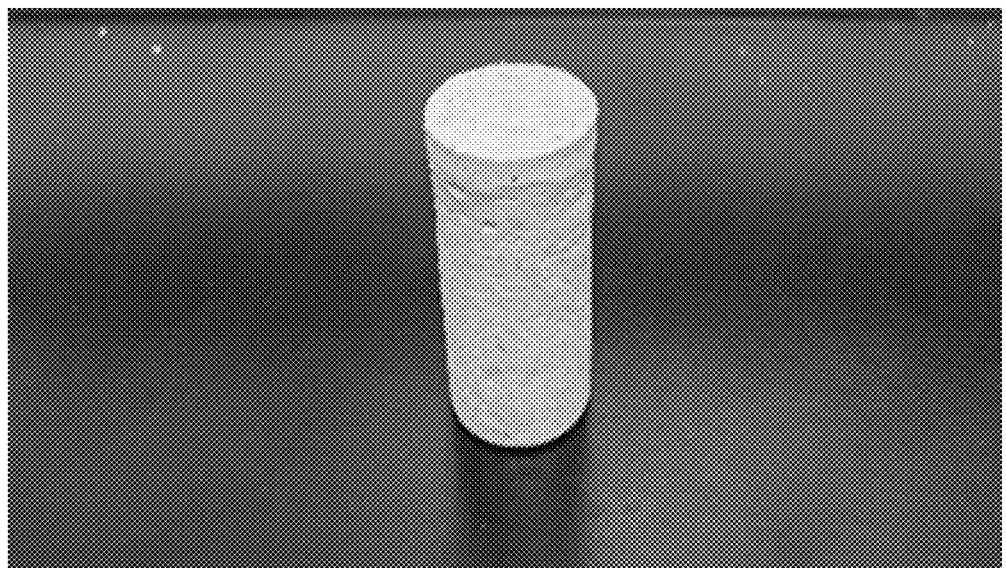
Figure 2D:
Figure 2E:
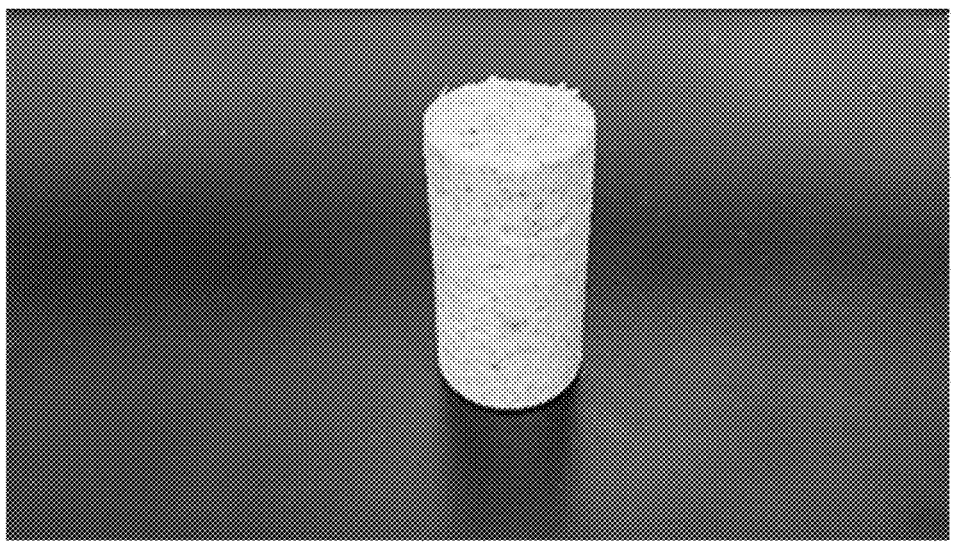
Figure 2F:

The ultra-high temperature resistant resin slurry plugging system suitable for a fractured-vuggy formation prepared in Examples 1 and 2 of the present disclosure exhibits better rheology (as shown in FIG. 1a and FIG. 1b). In Comparative Example 1, the performance of a suspension filling agent in a solution system was deteriorated (as shown in FIG. 1c) without a flow pattern regulator, so that the rheology of the resin slurry plugging system was sharply decreased, which further illustrates that the ultra-high temperature resistant resin slurry plugging system suitable for a fractured-vuggy formation can maintain a certain viscosity and can effectively suspend and disperse filling agents such as ultra-fine calcium carbonate and quartz sand due to the addition of the flow pattern regulator.

TABLE 2

Temperature resistance test data of resin slurry plugging system (heating at different temperatures for 48 h)

| Sample No. | Compressive strength (MPa) of various resin slurry plugging systems at different temperatures | | | | | |
|---|---|---|---|---|---|---|
| | 180° C. | 200° C. | 220° C. | 240° C. | 260° C. | 280° C. |
| $I_1$ | 32.35 | 30.12 | 28.33 | 27.52 | 26.97 | 20.23 |
| $I_2$ | 28.25 | 27.37 | 25.13 | 24.15 | 23.61 | 17.29 |
| $I_3$ | 31.23 | 29.85 | 27.18 | 26.74 | 25.32 | 19.17 |
| $I_4$ | 30.16 | 28.22 | 26.47 | 25.37 | 24.14 | 18.26 |
| $I_5$ | 32.14 | 29.84 | 28.19 | 27.36 | 26.48 | 19.65 |
| $I_6$ | 30.35 | 28.76 | 27.13 | 26.94 | 26.05 | 19.87 |
| $II_1$ | 22.12 | 21.55 | 20.37 | 18.35 | 17.63 | 10.35 |
| $II_2$ | 18.34 | 17.24 | 16.55 | 15.35 | 14.55 | 8.97 |
| $II_3$ | 20.16 | 19.48 | 18.54 | 16.96 | 15.84 | 9.72 |
| $II_4$ | 16.28 | 15.77 | 14.88 | 13.57 | 12.33 | 6.83 |
| $II_5$ | 30.29 | 29.56 | 28.49 | 27.19 | 26.27 | 19.84 |
| $II_6$ | 28.37 | 27.43 | 26.69 | 25.13 | 24.45 | 18.47 |
| $II_7$ | 24.19 | 22.94 | 22.08 | 21.24 | 20.18 | 12.42 |
| $II_8$ | 23.28 | 22.45 | 21.16 | 20.34 | 18.24 | 10.31 |

Figure 3A:
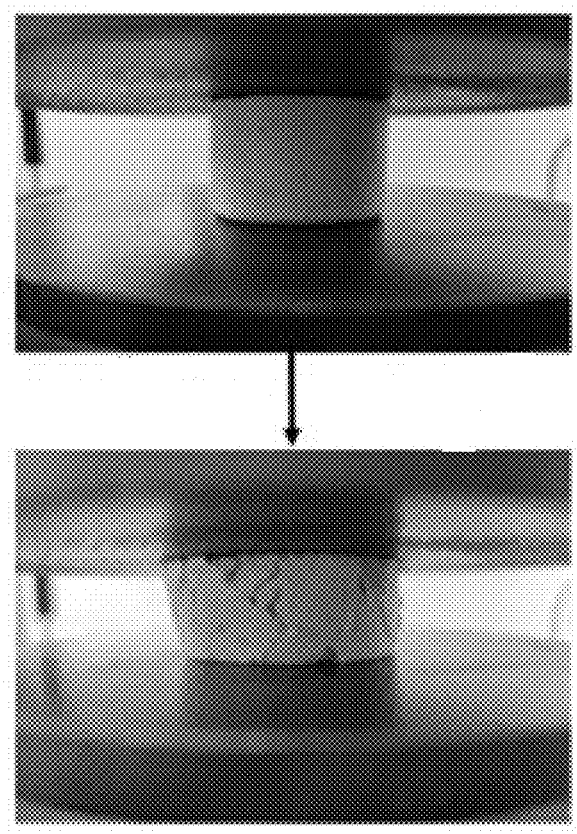
FIG. 3 is a photograph showing an appearance of a resin slurry plugging system prepared in Example 1 before and after a compression test after heating at different temperatures for 48 h.
Figure 3B:
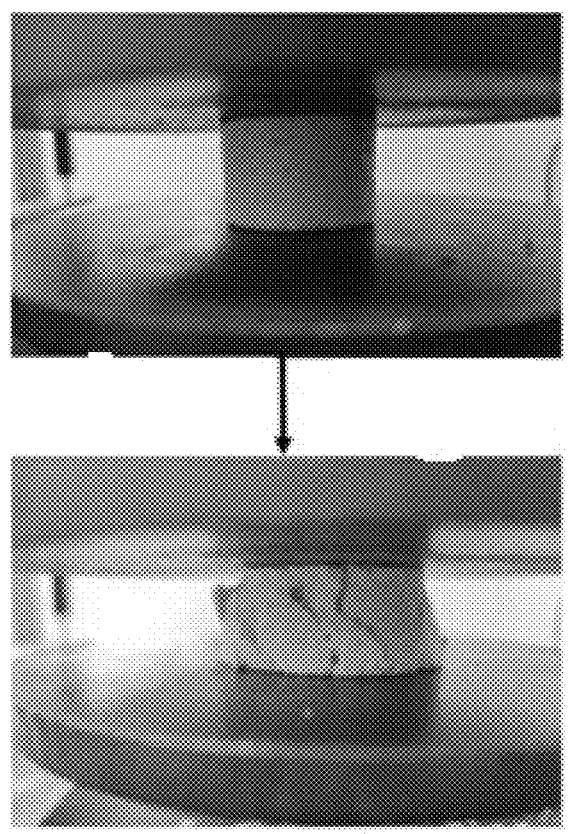
Figure 3C:
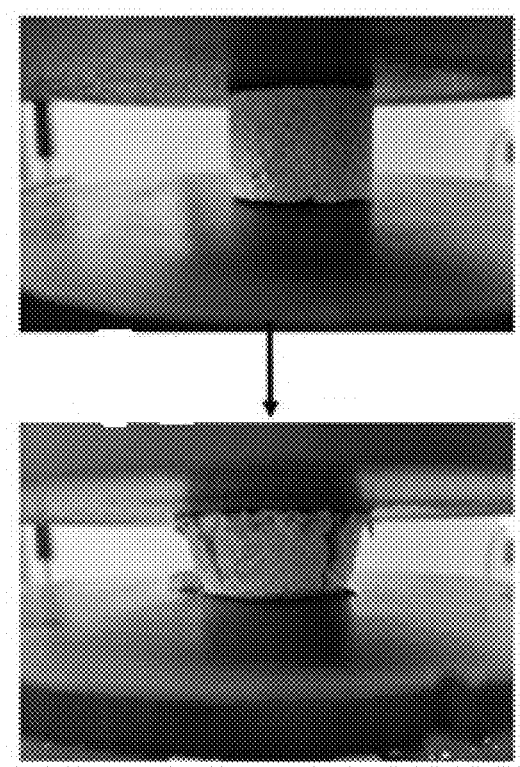

The ultra-high temperature resistant resin slurry plugging system suitable for a fractured-vuggy formation prepared in Examples 1-6 of the present disclosure can form high-strength consolidated bodies at 180-280° C., and exhibit good compressive properties, as shown in FIG. 2 and FIG. 3. The compressive strength of the resin slurry plugging system after consolidating is the highest at 180° C. The compressive strength is reduced with the increase of temperature. The compressive strength of the resin slurry plugging system after consolidating is reduced a little in the range of 180-260° C. When the temperature is higher than 260° C., the reduction of the compressive strength is increased. The compressive strength of the sample in Example 1 at 280° C. is 20.23 MPa, still higher than 20 MPa. Therefore, the ultra-high temperature resistant resin slurry plugging system suitable for a fractured-vuggy formation according to the present disclosure can meet the requirements of plugging at an ultra-high temperature of 280° C. In Comparative Example 1, the composite polymer high temperature resistant flow pattern regulator is not added, the compressive strength of the resin slurry plugging system after consolidating at various temperatures is reduced, and the overall temperature resistance is reduced. In Comparative Example 2, the diethylenetriamine is not added. In Comparative Example 3, the dimethyl triphenyl methane tetraisocyanate is not added. In Comparative Example 4, neither the diethylenetriamine nor the dimethyl triphenyl methane tetraisocyanate is added, which greatly reduces the compressive strength of the resin slurry plugging system after consolidating under ultra-high temperature conditions. In comparison, the influence of the cross-linking agent diethylenetriamine is greater. In Comparative Example 5, neither retarder sodium lignosulfonate nor calcium saccharate is added. It can be seen from the compressive strength data at various temperatures that the sodium lignosulfonate and the calcium saccharate have little effect on the temperature resistance and compressive strength of the resin slurry plugging system. In Comparative Example 6, the ultra-fine calcium carbonate is not added. In Comparative Example 7, the quartz sand is not added. In Comparative Example 8, neither ultra-fine calcium carbonate nor the quartz sand is added. By comparing the data with the data of the compressive strength in Example 1 at different temperatures, it can be concluded that the quartz sand is resistant to high temperature and can still provide a certain compressive strength for the resin slurry plugging system under the ultra-high temperature conditions.

TABLE 3

Consolidating condition and plugging effect of resin slurry plugging system

| Sample No. | Consolidating temperature (° C.) | Initial consolidating time (h) | Optimal consolidating time (h) | Compressive strength (MPa) |
|---|---|---|---|---|
| $I_1$ | 260 | 4.5 | 6.0 | 26.95 |
| $I_2$ | 260 | 5.5 | 8.0 | 23.63 |
| $I_3$ | 260 | 4.0 | 6.0 | 25.35 |
| $I_4$ | 260 | 5.0 | 7.0 | 24.17 |
| $I_5$ | 260 | 3.5 | 4.0 | 26.49 |
| $I_6$ | 260 | 4.5 | 6.0 | 26.08 |
| $II_1$ | 260 | 2.0 | 3.5 | 17.65 |
| $II_2$ | 260 | 7.0 | 12.0 | 14.58 |
| $II_3$ | 260 | 6.5 | 10.0 | 15.82 |
| $II_4$ | 260 | 9.0 | 18.0 | 12.31 |
| $II_5$ | 260 | 1.5 | 3.0 | 26.22 |
| $II_6$ | 260 | 4.5 | 6.0 | 24.41 |
| $II_7$ | 260 | 3.5 | 5.0 | 20.15 |
| $II_8$ | 260 | 3.5 | 4.5 | 18.23 |

TABLE 4

Test data of pressure-bearing plugging capacity at different temperatures

| Sample No. | Test data (MPa) of pressure-bearing plugging capacity at different temperatures | | | | | |
|---|---|---|---|---|---|---|
| | 180° C. | 200° C. | 220° C. | 240° C. | 260° C. | 280° C. |
| $I_1$ | 23.3 | 21.7 | 20.6 | 19.3 | 18.2 | 15.1 |
| $I_2$ | 20.5 | 19.3 | 18.1 | 16.8 | 15.6 | 13.9 |
| $I_3$ | 19.6 | 18.5 | 17.7 | 16.1 | 14.9 | 12.4 |
| $I_4$ | 21.1 | 19.7 | 18.6 | 17.2 | 16.3 | 14.1 |
| $I_5$ | 22.9 | 21.2 | 20.3 | 19.0 | 18.1 | 14.9 |
| $I_6$ | 19.2 | 18.2 | 17.5 | 15.9 | 14.7 | 12.1 |
| $I_7$ | 12.5 | 11.3 | 10.1 | 9 | 7.9 | 6.3 |
| $I_8$ | 12.2 | 11.1 | 10.2 | 9.1 | 7.8 | 5.9 |
| $I_9$ | 10.6 | 8.9 | 7.5 | 6.1 | 5.2 | 4 |
| $I_{10}$ | 11.2 | 10.1 | 9.2 | 8 | 6.9 | 5.6 |
| $I_{11}$ | 10.5 | 9.1 | 8 | 7.1 | 5.9 | 4.8 |
| $I_{12}$ | 11.1 | 10.2 | 8.9 | 7.4 | 6.5 | 5.2 |
| $I_{13}$ | 10.8 | 9.6 | 8.5 | 7.2 | 6.4 | 5.3 |
| $II_1$ | 7.4 | 6.9 | 6.7 | 6.5 | 6.2 | 3.2 |
| $II_2$ | 9.3 | 9.0 | 8.9 | 8.7 | 8.5 | 4.0 |
| $II_3$ | 8.5 | 8.1 | 8.0 | 7.8 | 7.4 | 3.6 |
| $II_4$ | 7.6 | 7.2 | 6.9 | 6.6 | 6.3 | 3.3 |
| $II_5$ | 22.3 | 21.0 | 20.1 | 18.8 | 17.8 | 14.6 |
| $II_6$ | 5.7 | 5.5 | 5.4 | 5.3 | 5.1 | 2.4 |
| $II_7$ | 4.5 | 4.2 | 4.1 | 3.9 | 3.7 | 1.9 |
| $II_8$ | 3.6 | 3.4 | 3.1 | 2.8 | 2.6 | 1.3 |
| $II_9$ | 19.3 | 18.1 | 16.9 | 15.3 | 14.2 | 13 |
| $II_{10}$ | 12.3 | 11 | 10.1 | 8.9 | 7.2 | 5.5 |
| $II_{11}$ | 10.5 | 9.1 | 8.2 | 7 | 5.9 | 4.2 |
| $II_{12}$ | 12.1 | 11.2 | 10.1 | 9 | 7.9 | 6.1 |
| $II_{13}$ | 12.2 | 11.1 | 10.2 | 9.1 | 7.8 | 5.9 |
| $II_{14}$ | 11.9 | 10.8 | 9.9 | 8.8 | 7.6 | 5.5 |
| $II_{15}$ | 12 | 11 | 10.2 | 9.3 | 8.1 | 6.2 |

Figure 4A:
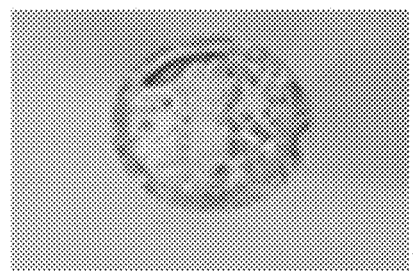
FIG. 4 is a photograph showing a filling effect of a resin slurry plugging system prepared in Example 1 in a fractured core model.
Figure 4B:
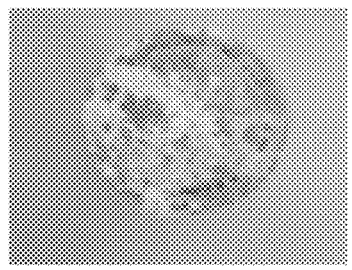
Figure 4C:
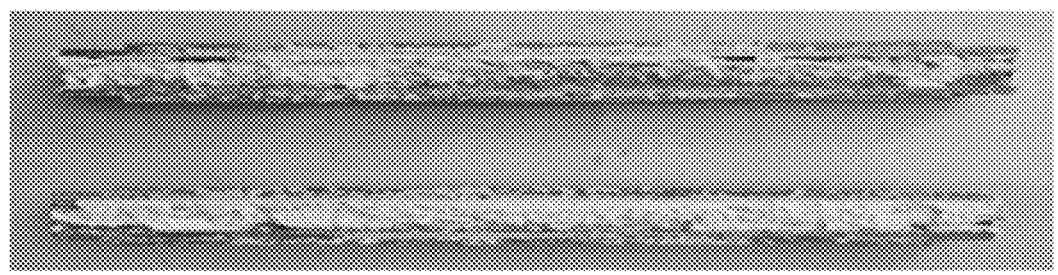
Figure 5:
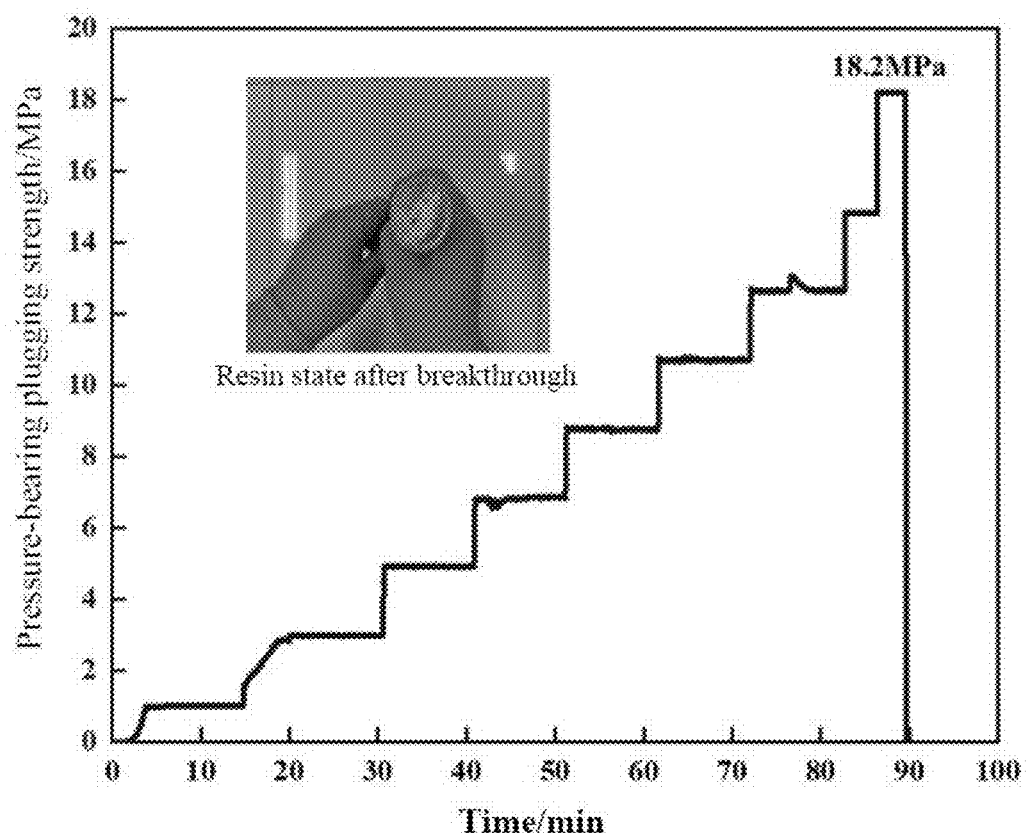
FIG. 5 is a graph showing a pressure-bearing plugging capacity of a resin slurry plugging system prepared in Example 1 in a fractured core model.

The initial consolidating time at 260° C. of the ultra-high temperature resistant resin slurry plugging system suitable for a fractured-vuggy formation prepared in Examples 1-6 of the present disclosure is 3.5-5.5 h, which can meet the construction safety of the plugging site and achieve the optimal consolidating effect in 4-8 h, so as to ensure that the plugging system is quickly consolidated after being pumped into a lost circulation location and the compressive strength after consolidating is greater than 20 MPa. The plugging effect test data shows that the resin slurry plugging system can play a better plugging function after being consolidated at 260° C. with the optimal consolidating time. As shown in FIG. 4 and FIG. 5, the pressure-bearing plugging effect of the ultra-high temperature resistant resin slurry plugging system prepared in Example 1 in a fracture core model (the test temperature is 260° C., and the consolidating time is the optimal consolidating time of the sample) shows that the pressure-bearing plugging strength of the ultra-high temperature resistant resin slurry plugging system suitable for a fractured-vuggy formation in the fracture core may reach 18.2 MPa after consolidating at 260° C. In Comparative Example 1, due to no addition of the flow pattern regulator, the consolidating time of the resin slurry plugging system may be shortened, the rheology of the plugging system may be deteriorated, and the filling agent cannot be suspended and uniformly dispersed, thus affecting the compressive strength and pressure-bearing plugging capacity of the resin slurry plugging system. In Comparative Examples 2-4, the initial consolidating time of the resin slurry plugging system is prolonged without adding the cross-linking agent. Although the safety construction conditions are met, it takes a long time to achieve the optimal consolidating effect, and the consolidating condition is uncontrollable, and the strength and plugging effect of the plugging system are weakened due to the lack of the cross-linking agent. In Comparative Example 5, the retarder is not added. Although it has little effect on the strength and plugging effect of the resin slurry plugging system, but the consolidating time is greatly shortened, which cannot meet the safe construction conditions. In Comparative Examples 6-8, the filling agent is not added, which has a certain effect on the consolidating time of the resin slurry plugging system. According to the data of compressive strength and plugging effect, the filling agent plays an important role in improving the pressure-bearing plugging capacity of the resin slurry plugging system. The data of Comparative Examples 9-15 shows that the structural composition of the composite resin plugging agent, the imidazole-oxazine consolidating agent, and the composite polymer high temperature resistant flow pattern regulator have a significant impact on the pressure-bearing plugging capacity of the plugging system.

It can be seen from the above data that the ultra-high temperature resistant resin slurry plugging system suitable for a fractured-vuggy formation prepared in the Examples of the present disclosure has excellent temperature resistance, compression resistance and plugging effect, and can meet the plugging requirements of an ultra-high temperature reservoir of 180-280° C. By combining filling of flexible resin and bridging of a rigid material, the lose channel plugging of different scales can be adapted, and the problem of lost circulation of an ultra-high temperature fractured-vuggy reservoir can be solved.

The preferred embodiments of the present disclosure have been described in detail above, but the present disclosure is not limited thereto. Within the scope of the inventive concept, a number of simple variants of the technical solution of the present disclosure are possible, including any other suitable combination of the individual features. These simple variants and combinations should likewise be considered as being disclosed as falling within the scope of protection of the present disclosure.

What is claimed is:

1. A resin slurry for a fractured-vuggy formation comprising: 20%-40% of composite resin plugging agent, 0.5%-5.0% of consolidating agent, 0.5%-5.0% of flow pattern regulator, 0.3%-1.2% of first cross-linking agent, 0.3%-1.2% of retarder, and 3%-12% of filling agent in water by weight, wherein the composite resin plugging agent comprises: 20-30 parts of phenolic resin, 0.3-0.8 parts of modifier, 5-15 parts of epoxy resin, 5-15 parts of unsaturated polyester resin, 0.5-1.5 parts of second cross-linking agent, and 0.2-0.6 parts of tackifying polymer by weight; the modifier is an isocyanate-terminated polyurethane prepolymer; the second cross-linking agent is a combination of styrene and trimethylolpropane; the mass ratio of the styrene:the trimethylolpropane is 1-3:1; the tackifying polymer is a copolymer of 2-acrylamide-2-methylpropane sulfonic acid and acrylic acid;

the composite resin plugging agent is prepared by:
(1) heating the phenolic resin to 90-110° C., vacuumizing and cooling the phenolic resin, adding the modifier, and obtaining a modified resin through a reaction; and
(2) uniformly mixing the modified resin, the epoxy resin and the unsaturated polyester resin to obtain a mixture, adding the mixture into a second portion of water, then successively adding the second cross-linking agent and the tackifying polymer, performing mixing and uniform dispersing, and then performing drying and crushing to obtain the composite resin plugging agent, wherein the consolidating agent is a bio-based latent consolidating agent; the bio-based latent consolidating agent is an imidazole-oxazine consolidating agent; the imidazole-oxazine consolidating agent is prepared from: 10-30 parts by mass of imidazole, 10-20 parts by mass of phytic acid, and 10-30 parts by mass of bisphenol A-benzoxazine; the preparing of the imidazole-oxazine consolidating agent comprising: adding a methanol solution of the phytic acid dropwise to a methanol solution of the imidazole to yield a first solution; adding the bisphenol A-benzoxazine to the first solution and mixing to yield a uniformly mixed solution, allowing the mixed solution to stand for layering and then extracting supernatant liquid from the mixed solution; and washing the supernatant liquid to obtain the imidazole-oxazine consolidating agent;

the flow pattern regulator is prepared from: 10-20 parts by mass of 2-acrylamide-2-methylpropane sulfonic acid, 4-10 parts by mass of N,N-methylene bisacrylamide, 20-25 parts by mass of acrylic acid, 10-20 parts by mass of N-vinyl pyrrolidone, 5-10 parts by mass of divinylbenzene, 2-3 parts by mass of sodium dodecyl sulfate, 5-10 parts by mass of modified hydrophilic inorganic nano-material, and 1-1.5 parts by mass of initiator; the modified hydrophilic inorganic nano-material is hydrophilic nano-silica with a particle size of 20-100 nm; the preparing of the flow pattern regulator comprising: adding the 2-acrylamide-2-methylpropane sulfonic acid, the N,N-methylene bisacrylamide, the 20-25 Parts by mass of acrylic acid, the N-vinyl pyrrolidone, the divinyl benzene, and the sodium dodecyl sulfate into deionized water to form a first mixture, adjusting the pH of the first mixture to neutral and then mixing to yield a uniformly mixed second mixture; adding the modified hydrophilic inorganic nano-material and the initiator to the second mixture and stirring to yield a reaction product, then precipitating, washing, drying, and grinding the reaction product to obtain the flow pattern regulator;

the first cross-linking agent is a combination of diethylenetriamine and dimethyl triphenyl methane tetraisocyanate; the mass ratio of diethylenetriamine to dimethyl triphenylmethane tetraisocyanate is 1-2:1;

the retarder is a combination of sodium lignosulfonate and calcium saccharate; the mass ratio of the sodium lignosulfonate to the calcium saccharate is 1:1; and the filling agent is a combination of ultra-fine calcium carbonate and quartz sand, and the mass ratio of the ultra-fine calcium carbonate to the quartz sand is 1-2:3-5.

2. The resin slurry according to claim 1, wherein the resin slurry comprises 20%-35% of the composite resin plugging agent, 1.0%-3.0% of the consolidating agent, 1%-3% of the flow pattern regulator, 0.4%-0.9% of the first cross-linking agent, 0.5%-1.0% of the retarder, and 5%-10% of the filling agent in the water by weight.

3. The resin slurry according to claim 1, wherein the phenolic resin is a water-soluble phenolic resin and the epoxy resin is a water soluble epoxy resin.

4. The resin slurry according to claim 1, wherein the initiator is a combination of azobis(isobutyronitrile), sodium bisulfite and ammonium persulfate, and the mass ratio of the azobis(isobutyronitrile):the sodium bisulfite:the ammonium persulfate is 1-3:1-4:2-8.

5. A method for preparing the resin slurry of claim 1, comprising:

adding the composite resin plugging agent into the water and stirring until fully dispersed to form a second solution; adding the retarder to the second solution and stirring until fully dispersed to form a third solution; then successively adding the first cross-linking agent, the consolidating agent and the flow pattern regulator to the third solution and stirring until fully dispersed to form a fourth solution; and adding the filling agent to the fourth solution and stirring until fully dispersed so as to obtain the resin slurry for the fractured-vuggy formation;

wherein the composite resin plugging agent comprises: the phenolic resin, the modifier, the epoxy resin, the unsaturated polyester resin, the second cross-linking agent, and the tackifying polymer;

the retarder is the combination of sodium lignosulfonate and calcium saccharate;

the first cross-linking agent is the combination of diethylenetriamine and dimethyl triphenyl methane tetraisocyanate;

the filling agent is the combination of ultra-fine calcium carbonate and quartz sand; and the flow pattern regulator comprises: the 2-acrylamide-2-methylpropane sulfonic acid, the N,N-methylene bisacrylamide, the 20-25 parts by mass of acrylic acid, the N-vinyl pyrrolidone, the divinylbenzene, the sodium dodecyl sulfate, the modified hydrophilic inorganic nano-material, and the initiator.

* * * * *